United States Patent [19]

Polacsek

[11] 4,244,145

[45] Jan. 13, 1981

[54] INDOOR PLANT GROWING APPARATUS

[76] Inventor: David D. Polacsek, 780 Oberlin Rd., Apt. #17, Elyria, Ohio 44035

[21] Appl. No.: 39,826

[22] Filed: May 17, 1979

[51] Int. Cl.³ .............................................. A01G 9/14
[52] U.S. Cl. .......................................... 47/17; 47/39; 47/69; 47/83
[58] Field of Search ..................... 47/39, 17, 69, 1, 83; 119/5

[56] References Cited

U.S. PATENT DOCUMENTS

| D. 209,768 | 1/1968 | Rasmussen | 47/69 X |
|---|---|---|---|
| 3,269,578 | 8/1966 | Lewis | 47/69 X |
| 3,314,192 | 4/1967 | Park | 47/39 X |
| 3,673,733 | 7/1972 | Allen | 47/17 X |
| 3,774,575 | 11/1973 | Patterson | 119/5 |

Primary Examiner—Robert E. Bagwill
Attorney, Agent, or Firm—Pearne, Gordon, Sessions, McCoy & Granger

[57] ABSTRACT

An indoor plant growing apparatus is disclosed which comprises a frame adapted to support a bed with a plant growing chamber being formed within the frame. A light fixture unit is mounted on the frame and includes means for providing light downwardly to the plants in the plant growing chamber. The apparatus may also include a vapor barrier which extends downwardly from the frame completely around the plant growing chamber to retain moisture therein. The vapor barrier provides a means for retaining moisture in the plant growing chamber to enhance the environment for the plants. The apparatus provides a plant growing area which utilizes the normally wasted space beneath a bed.

11 Claims, 4 Drawing Figures

INDOOR PLANT GROWING APPARATUS

BACKGROUND OF THE INVENTION

1. Field of the Invention

This invention relates to an apparatus for growing plants indoors, and specifically to an apparatus especially adapted for growing plants in the normally unused space under a bed.

2. Description of the Prior Art

Various apparatus have been developed for growing plants indoors. These apparatus usually include a growing area illuminated by a special light fixture adapted to provide necessary artificial light which simulates sunlight, so that the plants can be grown indoors.

A placement problem often arises with conventional indoor plant growing apparatus because they usually require considerable space. As a result, many indoor plant growing apparatus are maintained in a basement or a storage area. However, this arrangement makes the plants which grow in the apparatus relatively inaccessible and the watering, feeding, and other caring for the plants is inconvenient.

SUMMARY OF THE INVENTION

These and other problems of the prior art indoor plant growing apparatus are overcome by the present invention. The present invention provides an indoor plant growing apparatus which utilizes the space under a conventional bed, which space is ordinarily not otherwise used. The invention may also provide a vapor barrier surrounding chamber in which the plants are grown to retain moisture in that chamber and provide a more beneficial environment for the growing plants.

The present invention provides an artificially illuminated indoor plant garden that fits beneath a bed and replaces the bed frame which supports a mattress and/or box spring combination. Using the present invention, exotic and interestng, as well as normal, house plants can be grown indoors under controlled conditions without losing any additional floor or cabinet space, as is usually necessary with plant growing apparatus of the prior art. The plant growing apparatus of the present invention is located vertically below the space occupied normally by a bed, thus utilizing the normally otherwise wasted space beneath the bed for the pleasure and profit of growing plants indoors.

These and other advantages are provided by the present invention which provides an indoor plant growing apparatus to be located on a floor, which apparatus comprises a frame adapted to support a bed, with a plant growing chamber being formed within the frame. A light fixture unit is mounted on the frame and includes means for providing light downwardly onto the plants in the plant growing chamber.

The indoor plant growing apparatus of the present invention also preferably comprises a vapor barrier which extends downwardly from the frame to the floor completely around the plant growing chamber to retain moisture in the chamber.

The frame preferably comprises two parallel, horizontally extending side braces attached together at each end by two horizontally extending end braces. The side and end braces are supported in a spaced relationship above the floor by at least four horizontally spaced vertically extending legs, with the plant growing chamber being formed beneath the side and end braces and between the legs.

DETAILED DESCRIPTION OF THE PREFERRED EMBODIMENTS

Figure 1:
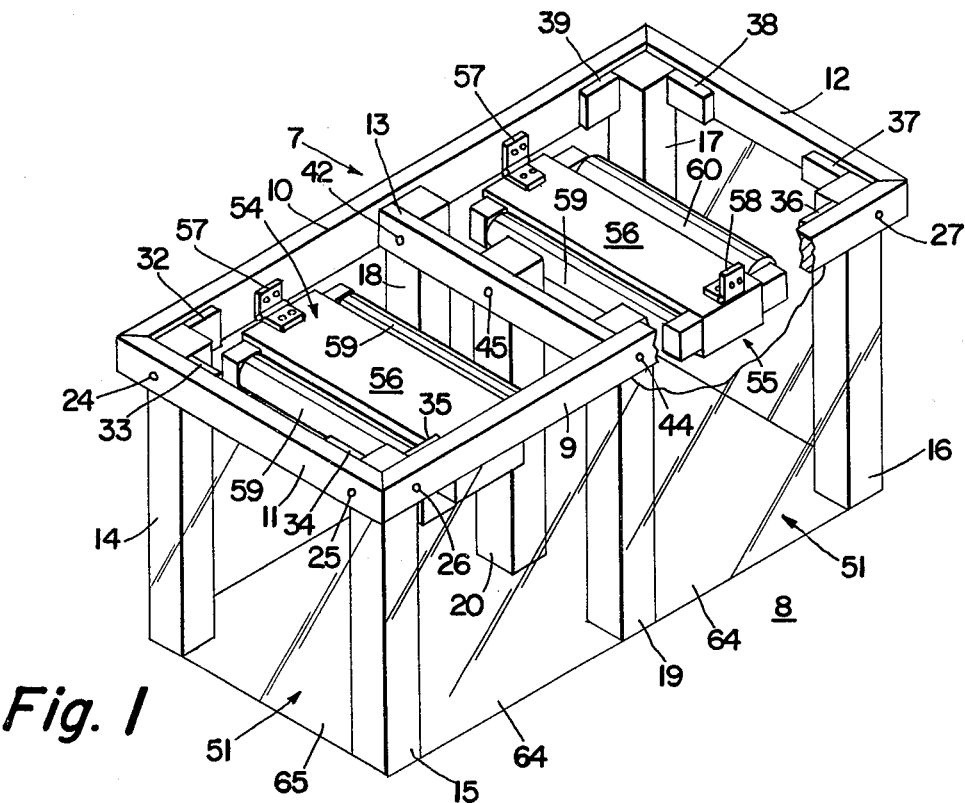
FIG. 1 is perspective view of the indoor plant growing apparatus of the present invention, with the bed unit removed and with a small portion broken away.
Figure 2:
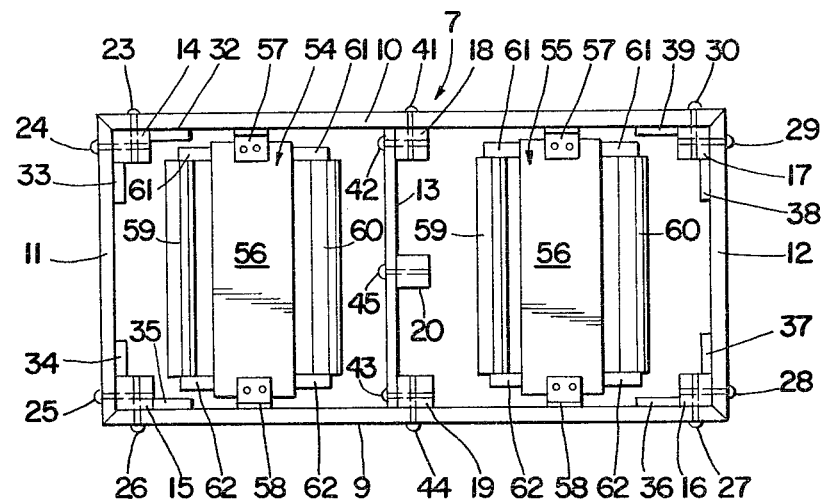
FIG. 2 is a top plan view of the indoor plant growing apparatus of FIG. 1.
Figure 3:
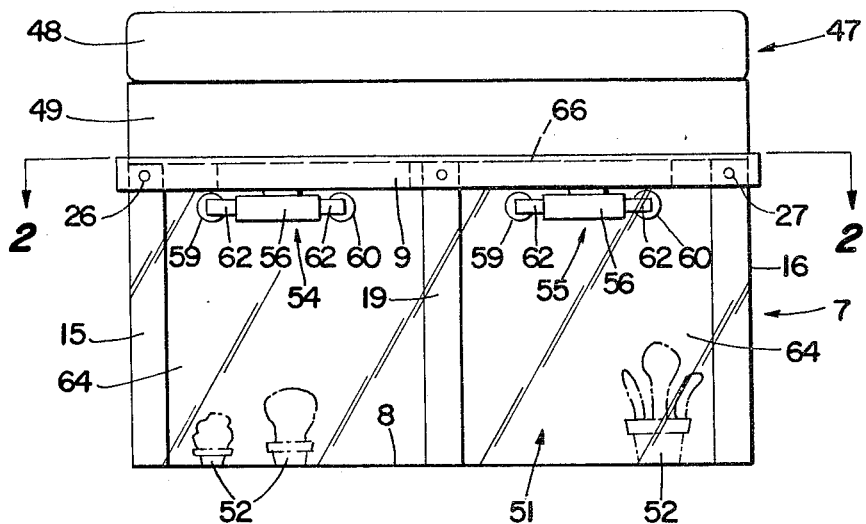
FIG. 3 is a side elevational view of the apparatus of FIGS. 1 and 2, with the bed unit in place.

Referring more particularly to the drawings, FIGS. 1-3 show a preferred form of the plant growing apparatus of the present invention. The apparatus is comprised of a frame 7 which rests on a floor 8. The frame 7 preferably comprises two side rails or braces 9 and 10, two end rails or braces 11 and 12, a center brace 13, four corner supporting legs 14, 15, 16, and 17, two side supporting legs 18 and 19, and a center supporting leg 20.

The frame 7 is preferably formed of wood, which may be stained, varnished, or painted in appropriate colors to match the decor of the bedroom or other room in which the apparatus is located. If desired, however, any other type of material may be used, such as plastic, iron, aluminum, or other metal.

The side braces 9 and 10 extend horizontally and parallel to each other. The side braces 9 and 10 are attached together at each end by the two horizontally extending end braces 11 and 12, so that the side and end braces 9–12 generally form a rectangle when viewed from above (FIG. 2). The side braces 9 and 10 may also be attached together in the middle by horizontally extending center brace 13 which extends between the two side braces 9 and 10 and is parallel to and midway between the end braces 11 and 12.

The side and end braces 9–12 are supported above the floor 8 by the corner supporting legs 14–17. Each leg 14–17 is attached to a corner formed between the side and end braces 9–12 by a pair of mounting bolts 23–30. One of each pair of bolts extends through a side brace and the other extends through an end brace. The bolts 23–30 firmly anchor the corner supporting legs 14–17 in place and also serve to firmly attach the ends of the side braces 9 and 10 to the end braces 11 and 12. To prevent the frame from wobbling, a plurality of antisway stops 32–39 may also be provided on each side of the corner supporting legs adjacent to the inside surfaces of the side and end braces. The antisway stops 32–39 prevent lateral and transverse motion of the frame during use of the bed which is also supported by the frame.

To further support the frame, the cente brace 13 may be provided between the center of the side br ce 9 and the center of the side brace 10. The pair of side supporting legs 18 and 19 support the center of each side brace 9 and 10. Pairs of mounting bolts 41–57 provide a means of attachment of the side supporting legs 18 and 19 to the side braces 9 and 10 and the center brace 13 and also provide a means for securing the center brace 13 to the side braces 9 and 10. Additional support may also be provided by a center supporting leg 10 which is located amid the frame 7. The center supporting leg 10 is attached to the middle of the center brace 13 by a bolt 45.

If desired, additional center braces and supporting legs may be added.

As shown in FIG. 3, the frame supports a bed unit 47 comprising a mattress 48 and a box spring 49. As shown particularly in FIGS. 1 and 3, the side braces 9 and 10 and the end braces 11 and 12 extend slightly above the top of the supporting legs 14-19, and above the top of the center brace 13 and above the top of the antisway stops 32-39. The bottom of the box spring 49 thus fits within the side and end braces 9-12 and rests on top of the supporting legs 14-20 and the center brace 13, so that the side and end braces 9-12 support the outside of the box spring 49 and prevent horizontal movement of the box springs 49 which could result in the box spring falling off the frame 7. Thus, the side and end braces 9-12 form a small lip or protective edge which prevents the bed unit 47 from slipping off the supporting legs 14-20.

A plant growing chamber 51 is formed within the frame 7 below the braces 9-12 and between the supporting legs 14-19. As shown in FIG. 3, the plant growing chamber 51 may be filled as desired with plants 52 which may rest on the floor 8, or may be suitably supported at a level above the floor by risers as needed (not shown).

Light is provided to the plants 52 in the plant growing chamber 51 by a pair of light fixture units 54 and 55. The light fixture units 54 and 55 are substantially identical, each comprising a housing 56 which is attached to and supported on the side braces 9 and 10 by a pair of brackets 57 and 58. Each light fixture unit also has a pair of fluorescent lamp tubes 59 and 60 which are attached to the housing 56 at each end by conventional fluorescent tube sockets 61 and 62. Preferably, two 40-watt fluorescent lamp tubes are used with each light fixture unit. As shown in FIG. 3, the sockets 61 and 62 preferably extend horizontally outwardly from the housing 56, rather than extending vertically downwardly from the housing. In this manner, each of the lamp tubes 59 and 60 may be mounted beside the housing 56, rather than beneath it, so that the light fixture unit uses less space and the maximum possible plant growing area is provided in the chamber 51 below the light fixture unit, allowing more space for the growth of the plants, and the height of the bed unit 47 above the floor is minimized.

The preferred light fixture units 54 and 55 include an internal coating along the top of each lamp tube 59 and 60 which reflects upwardly directed light downwardly to increase the amount of light provided to the plants 52 in the plant growing chamber 51. Each lamp tube 59 and 60 has an internal reflective coating along its upper surface that directs the maximum amount of light downwardly so that none of the light is wasted by being directed upwardly to the top of the frame.

The light fixture units 54 and 55 are connected by suitable electrical connections (not shown) to an electrical source. If desired, the fixture units may also be connected to an automatic timer apparatus so that the operation of the light fixture units 54 and 55 may be automatically controlled. Such a timing apparatus would include means for providing that the light fixtures are in operation a prescribed number of hours each day. In addition, the timing apparatus may be programmable so it controls the length of time the lights are on daily in a decreasing or increasing amount each day to simulate the change of seasons, so that the plant is grown in an environment which simulates the environment in which the plant naturally grows.

Instead of the fluorescent light fixture units shown, any other type of light source can be utilized, such as incandescent lights, mercury vapor lamps, or sodium vapor lamps.

In order to provide the proper environment for the plants in the plant growing chamber 51, the apparatus also may include a vapor barrier which extends completely around the chamber 51. The vapor barrier includes vertically extending side portions 64 which extend each of the side supporting legs 18 and 19 to the adjacent corner supporting legs 14-17 and which extend entirely from the side braces 9 or 10 to the floor 8. The vapor barrier also comprises vertically extending end portions 65 which extend between each adjacent pair of corner supporting legs 14-17 and which extend entirely from the end braces 11 or 12 to the floor 8. In addition, the vapor barrier comprises a horizontally extending top portion 66 which extends between the side and the end braces 9-12 across the top of the frame 7. The vapor barrier portions 64-66 together enclose the plant growing chamber 51 and provide a means for retaining moisture within the plant growing chamber to provide a more beneficial environment for the plants therein and to reduce the amount of watering required of the plants. In addition, the top vapor barrier portion 66 prevents moisture in the chamber 51 from reaching the bed unit 47 which is supported by the frame 7, so that the penetration of harmful moisture is prevented and the box springs 49 and the mattress 48 and the bedding thereon are protected from destruction due to the moisture from the plant growing chamber which is provided to the plants.

Preferably, the vapor barrier portions 64-66 comprise clear plastic sheet material, such as polyethlene. The vapor barrier portions may also be tinted plastic sheets or cloth. Instead of plastic sheets, aluminum foil may be used for the vapor barrier portions 64-66. Aluminum foil would reflect light as much as possible from the light fixture units 54 and 55 into the plant growing chamber 51. The side and end portions 64 and 65 of the vapor barrier are preferably attached to the adjacent supporting legs, such as by staples or glue. Certain portions may be left unattached to the adjacent supporting legs to provide access to the plants in the chamber 51.

The plant growing chamber 51 may also be provided with environmental controllers to control the temperature or humidity within the chamber. Known humidity and heat controllers can be used to maintain a constant temperature or to provide for a temperature variation throughout the day. In addition, known automatic humidity controllers can be used to provide higher or lower humidities for various species of plants.

Figure 4:
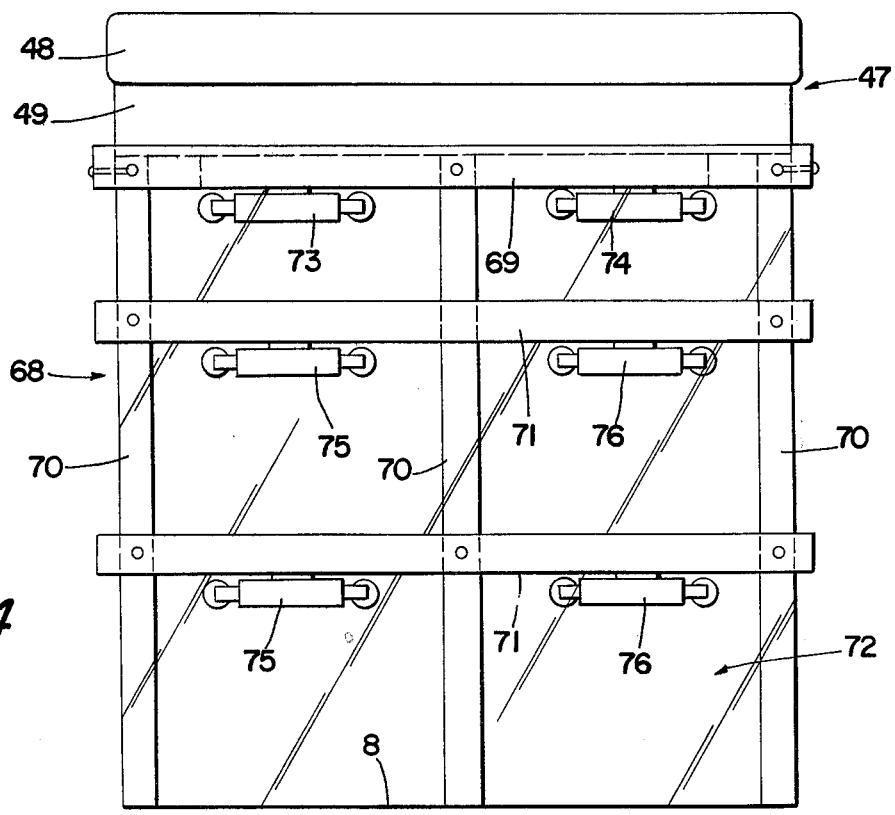
FIG. 4 is side elevational view similar to FIG. 3 of another embodiment of the invention having multiple levels.

While the preferred embodiment of the invention shown in FIGS. 1-3 provides adequate plant growing space for most common needs, it is possible to increase the amount of plant growing area by providing a multi-level plant growing apparatus as shown in FIG. 4. The multilevel unit of FIG. 4 comprises a frame 68 which includes horizontally extending side and end braces 69 which are similar to the side and end braces 9-12, supported above the floor 8 by vertically extending supporting legs 70 which may be similar to legs 14-17, but which are substantially longer. Below the side and end braces 69 and parallel thereto are one or more horizontally extending shelves 71 for the placement of plants with a plant growing chamber 72 formed thereby. A pair of substantially identical light fixture units 73 and 74 are attached to the side and end braces 69, as with the units 54 and 55 of FIGS. 1-3. Additional substantially identical light fixture units 75 and 76 are attached to the bottom of each shelf 71. Each light fixture unit 73-75 may be of the same construction and the units 54 and 55 may be set to provide a different lighting cycle for the particular plants below it. In addition, different humidity controls may be maintained on each level between the shelves 71 so that different species of plants may be grown in different environments. As with the previous embodiment, a vapor barrier may be provided on all sides around the plant growing chamber 72. The vapor barrier may comprise several side portions and end portions and a top portion as before.

While preferred forms of this invention have been specifically illustrated and described herein, it will be apparent to those skilled in the art that modifications and improvements may be made to the forms herein specifically disclosed. Accordingly, the present invention is not to be limited to the forms herein specifically disclosed or in any other way inconsistent with the progress in the art promoted by this invention.

What is claimed is:

1. An indoor plant growing apparatus to be located on a floor, which comprises:
   a frame adapted to support a bed, a plant growing chamber being formed within said frame;
   a bed unit mounted on said frame; and
   a light fixture unit mounted on said frame, said light fixture unit including means for providing light downwardly onto plants in said plant growing chamber.

2. An indoor plant growing apparatus as in claim 1, comprising in addition a vapor barrier extending downwardly from said frame completely around said plant growing chamber and adapted to extend to the floor, for retaining moisture in said plant growing chamber.

3. An indoor plant growing apparatus as in claim 2, wherein said vapor barrier includes a top portion which extends across the top of said frame between said side and end braces to prevent moisture in said chamber from the bed unit.

4. An indoor plant growing apparatus as in claim 2, wherein the vapor barrier is formed of a thin plastic sheet material.

5. An indoor plant growing apparatus as in claim 1, wherein said frame comprises two parallel horizontally extending side braces attached together at each end by two horizontally extending end braces, the side braces and the end braces being supported in a spaced relationship above the floor by at least four horizontally spaced vertically extending legs, the plant growing chamber being formed beneath said side and end braces and between said legs.

6. An indoor plant growing apparatus as in claim 5, wherein said frame comprises in addition a pair of legs, one supporting the center of each side brace.

7. An indoor plant growing apparatus as in claim 5, wherein said frame comprises in addition at least four pairs of antisway stops, each pair of stops attached to the side and end braces adjacent to each of each said legs to prevent wobbling of said frame.

8. An indoor plant growing apparatus as in claim 5, wherein said frame comprises in addition a center brace extending between the middle of said side braces.

9. An indoor plant growing apparatus as in claim 8, wherein said frame comprises in addition a center supporting leg supporting the middle of said center brace.

10. An indoor plant growing apparatus as in claim 1, wherein said light fixture unit comprises a housing having a fluorescent lamp tube mounted on each side horizontally spaced from said housing.

11. An indoor plant growing apparatus to be located on a floor which apparatus comprises:
   a frame comprising two parallel horizontally extending side braces attached together at each end by two horizontally extending end braces, the side and end braces supported in a spaced relationship above the floor by at least four horizontally spaced vertically extending legs, a plant growing chamber being formed within said frame between said side and end braces and the floor and between said legs;
   a bed unit mounted on said frame;
   a light fixture unit mounted on said frame between said side braces, said light fixture unit comprising a housing mounted between said side braces and a pair of fluorescent lamp tubes mounted on each side of said housing for providing light downwardly onto plants in said plant growing chamber; and
   a vapor barrier of thin sheet material comprising side and end portions extending between said legs and extending between said side and end braces and the floor, and a top portion extending across the top of said frame between said side and end braces, said vapor barrier adapted to retain moisture in said plant growing chamber.

* * * * *